(12) United States Patent
Waldrop, III et al.

(10) Patent No.: US 11,260,957 B2
(45) Date of Patent: Mar. 1, 2022

(54) RUPTURE FAIRINGS

(71) Applicant: The Boeing Company, Chicago, IL (US)

(72) Inventors: John Cleveland Waldrop, III, Saint Peters, MO (US); Manny S. Urcia, Jr., Wildwood, MO (US); Robert Ray Johnson, Kirkwood, MO (US); Samuel Jerome Huhman, Hazelwood, MO (US); Xue Liu, Maryland Heights, MO (US); William A. Lamey, III, Saint Peters, MO (US); Anthony Roberts, O'Fallon, MO (US); Lucian Woods, Florissant, MO (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 16/265,443

(22) Filed: Feb. 1, 2019

(65) Prior Publication Data

US 2020/0247527 A1 Aug. 6, 2020

(51) Int. Cl.
 *B64C 7/00* (2006.01)

(52) U.S. Cl.
 CPC .................................... *B64C 7/00* (2013.01)

(58) Field of Classification Search
 CPC ....................................................... B64C 7/00
 See application file for complete search history.

(56) References Cited

U.S. PATENT DOCUMENTS

| 3,140,638 A | 7/1964 | De Luca | |
|---|---|---|---|
| 3,362,291 A | 1/1968 | De Luca | |
| 5,460,676 A * | 10/1995 | Jensen | B29C 53/585 |
| | | | 102/293 |
| 5,463,957 A * | 11/1995 | Jensen | B29C 70/207 |
| | | | 102/293 |
| 5,464,172 A * | 11/1995 | Jensen | B29C 70/207 |
| | | | 102/293 |
| 2016/0318627 A1* | 11/2016 | Lucas | B64D 45/00 |

* cited by examiner

*Primary Examiner* — Jessica B Wong
(74) *Attorney, Agent, or Firm* — Hanley, Flight & Zimmerman, LLC

(57) ABSTRACT

Rupture fairings are disclosed. A disclosed example fairing for use with an aircraft includes a surface to at least partially define an exterior surface of the aircraft when the fairing is installed onto the aircraft, and a membrane to rupture during flight of the aircraft, where the membrane defines at least a portion of the exterior surface.

23 Claims, 13 Drawing Sheets

RUPTURE FAIRINGS

FIELD OF THE DISCLOSURE

This disclosure relates generally to aircraft and, more particularly, to rupture fairings.

BACKGROUND

Some aircraft utilize components or devices that are either mounted external to the aircraft or exposed to an exterior of the aircraft via an external opening. In particular, an externally facing device, such as a weapon of the aircraft, for example, can face out of or away from the external opening to operate. The presence of this external opening can affect overall aerodynamic properties of the aircraft by causing a disturbance in airflow around the aircraft. To reduce negative aerodynamic effects of the external opening during flight, the external opening is typically covered by a movable door or cover to maintain favorable aerodynamic properties. However, implementation of the aforementioned door or cover can involve significant cost, weight and complexity.

SUMMARY

An example fairing for use with an aircraft includes a surface to at least partially define an exterior of the aircraft when the fairing is installed onto the aircraft, and a membrane to rupture during flight of the aircraft, where the membrane defines at least a portion of the surface.

An example aircraft includes a fairing defining at least a portion of the exterior of the aircraft, where the fairing covers an opening of the aircraft, and a membrane at least partially defining the fairing, where the membrane is to be ruptured during a flight of the aircraft.

An example method of exposing an opening at an external surface of an aircraft during flight of the aircraft includes rupturing a membrane of a fairing disposed at the opening of the aircraft during the flight, where the fairing at least partially defines the external surface.

An example apparatus includes means for covering an external opening of an aircraft having means for rupturing the means for covering the external opening to expose the external opening during flight of the aircraft.

Figure 1:
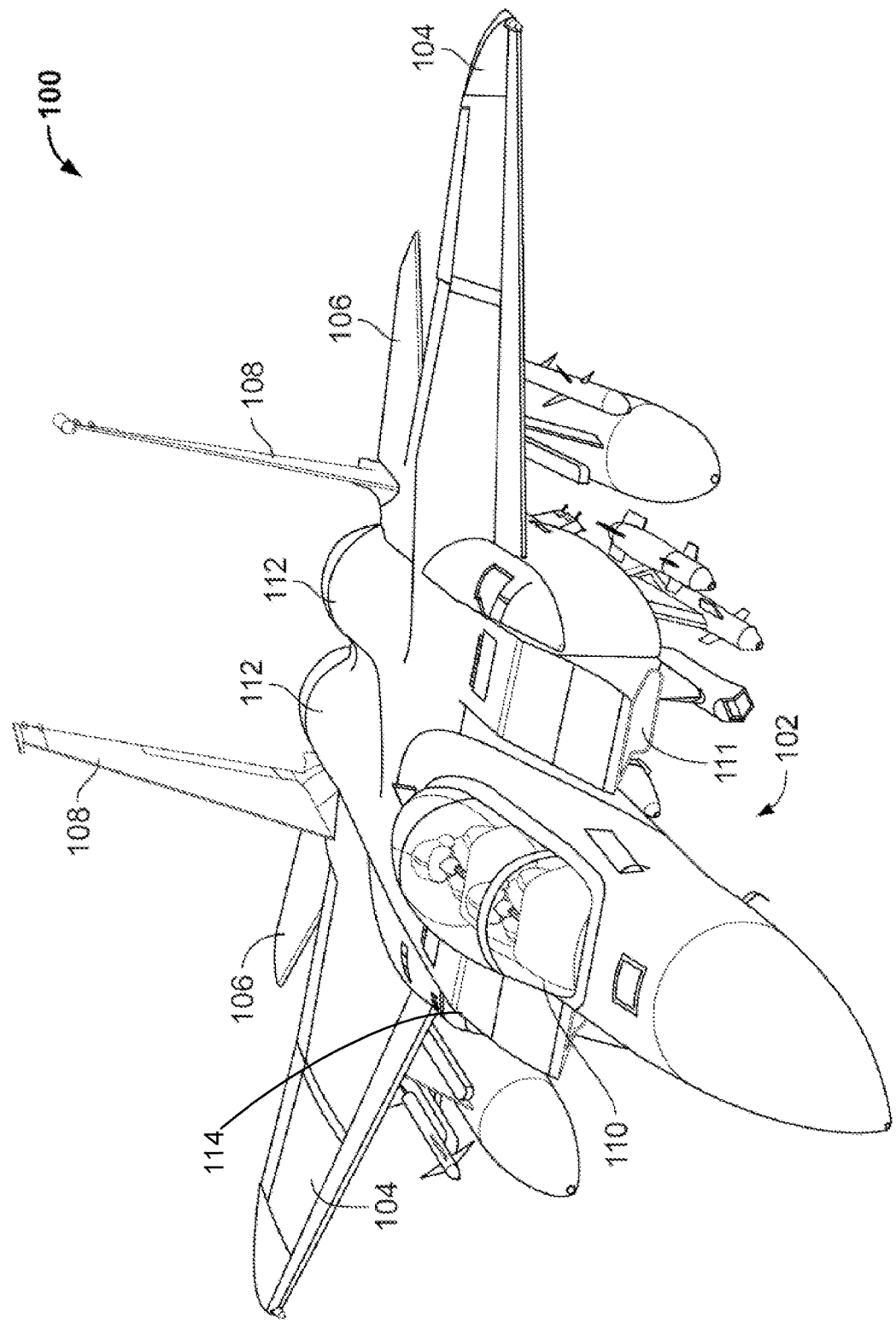
FIG. 1 illustrates an example aircraft in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Rupture fairings are disclosed. Some known aircraft employ doors and/or movable covers to allow a device, such as a sensor or weapon, for example, of the aircraft to be exposed to an external environment of the aircraft during flight. However, use of these doors or covers can entail significant cost, weight and complexity. In particular, doors can require moving linkages, complex parts and actuators to move the doors during flight.

Examples disclosed herein utilize rupture fairings (e.g., removable fairings, removable rupture fairings, means for covering an external opening of an aircraft, etc.) to reduce a need for costly and complex opening covers, thereby saving weight and cost. Further, examples disclosed herein enable favorable flight dynamics while allowing intended exposure of components during flight. Examples disclosed herein can also enable intended fracture during events (e.g., pressure changes, temperature, etc.).

Examples disclosed herein employ a fairing with a relatively thin membrane (e.g., a thinned membrane, rupturing means) that ruptures during flight of an aircraft and provides significant resistance and strength to aerodynamic loads, impacts (e.g., impacts related to weather, animals, freezing, moisture, fluid, sand, etc.), ultraviolet (UV) radiation, electromagnetic interference, magnetic interference, handling, etc. during flight.

In some examples, the relatively thin membrane can be caused to rupture during operation of a device (e.g., a gun, a sensor, etc.) disposed behind a corresponding external opening of the aircraft. In some examples, the relatively thin membrane includes a fracture pattern (e.g., means for fracturing) surrounded by a flange portion. In some examples, a relief channel (e.g., means for increasing a flexibility) surrounds the relatively thin membrane to increase a conformability of a corresponding rupture fairing. Additionally or alternatively, tabs extend from the relatively thin membrane. In some examples, a rupture fairing is at least partially composed of cyanate ester. In some examples, a rupture fairing is flush-mounted. In some examples, a rupture fairing is implemented to define an external store of an aircraft.

As used herein, the terms "fairing" or "rupture fairing" refer to a placed component and/or assembly that is used to define at least a portion of an external surface of a vehicle (e.g., an aircraft, a land vehicle, a boat, etc.). As used herein, the terms "rupture" or "rupturing" can refer to a fracturing, partial separation, full separation, crack propagation and/or splitting of a component. As used herein, the terms "relatively thin membrane" or "thinned membrane" refer to a portion of a component in which a portion thereof is relatively thin to facilitate internal fracturing and/or separation (e.g., separation of multiple portions).

FIG. 1 illustrates an example aircraft 100 in which the examples disclosed herein may be implemented. The aircraft 100 of the illustrated example includes a fuselage 102, wings 104, horizontal stabilizers 106, vertical stabilizers 108, a cockpit 110, air intakes 111 and engines 112.

In operation, the engines 112, which are jet engines in this example, generate thrust to propel the aircraft 100 forward while the wings 104 generate lift. Accordingly, during flight, control surfaces on the wings 104, the horizontal stabilizers 106 and/or the vertical stabilizers 108 are used to maneuver the aircraft 100 while thrust is provided by the engines 112 during flight. As a result, exterior surfaces of the aircraft 100 can be subjected to significant aerodynamic forces and/or impacts. During flight, portions of an exterior component 114, which is implemented as a gun diffuser of an onboard gun assembly in this example, are exposed to an exterior of the aircraft 100 via an opening. In turn, the resulting surface incongruities during exposure of the opening can cause unfavorable aerodynamic effects to the aircraft 100.

To mitigate these unfavorable aerodynamic effects, doors are implemented in some known examples to cover the opening. In particular, the doors utilize an opening mechanism and/or actuator to open and close. However, such implementations can require significant cost, weight and design complexity. In contrast, examples disclosed herein enable use of light-weight rupture fairings to provide favorable aerodynamic conditions. In particular, the aforementioned rupture fairings of examples disclosed herein can provide sufficient strength to maintain desired aerodynamic properties, but can still be ruptured during use of an onboard device.

Figure 2:
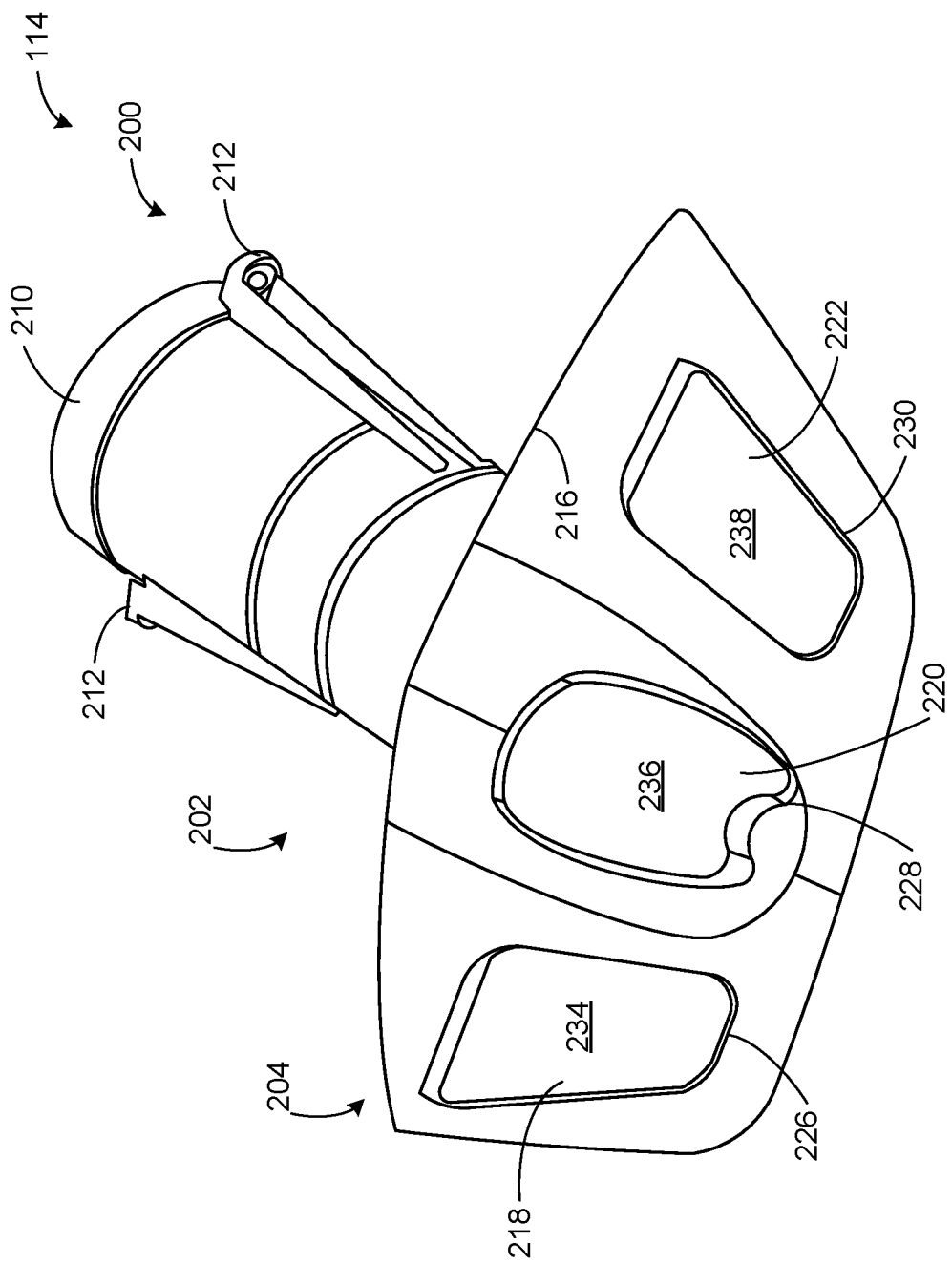
FIG. 2 is a detailed view of an example gun diffuser assembly of the example aircraft of FIG. 1.

FIG. 2 is a detailed view of an example gun diffuser assembly 200 of the aircraft 100 of FIG. 1. In particular, the external component 114 shown in FIG. 1 includes the gun diffuser assembly 200. The gun diffuser assembly 200 of the illustrated example includes a mounting portion (e.g., a mounting stem) 202, and an external surface portion 204. The mounting portion 202 includes a stem 210 and flange mounts 212 that are implemented to secure the gun diffuser assembly 200 to the aircraft 100 shown in FIG. 1. The example surface portion 204 includes an external surface 216 with rupture fairings (e.g., gun diffuser plugs) 218, 220, 222 mounted thereto. In this example, the rupture fairings 218, 220, 222 are shown assembled to respective openings 226, 228, 230.

To maintain desired aerodynamic properties during flight of the aircraft 100, the rupture fairings 218, 220, 222 are assembled to the openings 226, 228, 230, respectively, with a relatively tight fit and/or overlapping (e.g., an interference fit, a compression fit, etc.). As a result, a desired airstream over corresponding external surfaces 234, 236, 238, as well as the surface 216 is maintained, while the rupture fairings 218, 220, 222 significantly retain their shape with encountered aerodynamic and attachment loads. In other words, the external surfaces 234, 236, 238 enable a continuous airstream flow with the surface 216, thereby reducing a relatively significant drag coefficient that would otherwise be present when the openings 226, 228, 230 are exposed.

Further, according to the illustrated example, each of the rupture fairings 218, 220, 222 is composed of an elastic material to reduce (e.g., eliminate) gaps between the rupture fairings 218, 220, 222 and their respective openings 226, 228, 230. For example, the rupture fairings 218, 220, 222 can be at least partially composed of epoxy (e.g., high grade epoxy) or cyanate ester (e.g., CE 221 cyanate ester resin, etc.). Additionally or alternatively, the rupture fairings 218, 220, 222 are produced during an additive manufacturing process (e.g., 3-D printing, a continuous liquid interface production (CLIP) process, etc.), thereby enabling cost-effective production with relatively complex shapes and/or geometries to match corresponding openings and/or other aerodynamic surfaces. However, any other appropriate materials and/or processes can be implemented instead.

To enable exposure of at least one of the openings 226, 228, 230 during operation of the gun diffuser assembly 200, the rupture fairings 218, 220, 222 are caused to rupture and/or fracture. In particular, the surfaces 234, 236, 238 define thinned portions or sections (e.g., thinned membrane portions, thinned members, thinned membranes, etc.) that are ruptured due to gun blast pressure and/or a pressure wave from a gun blast associated with the gun diffuser assembly 200. As a result, the corresponding openings 226, 228, 230 are at least partially exposed during use of the gun diffuser assembly 200. In other examples, however, at least one of the rupture fairings 218, 220, 222 is ejected from the gun diffuser assembly 200 during use of the gun diffuser assembly 200. Additionally or alternatively, the rupture fairings 218, 220, 222 are ruptured based on launch impacts, high pressure events in which a pressure threshold is exceeded and/or high temperature events in which a temperature threshold is exceeded. In some examples, the thinned portions are approximately 0.060 inches thick or less. However, any appropriate thickness can be implemented instead.

In some examples, the rupture fairings 218, 220, 222 rupture or fracture in a brittle matter. In some examples, the rupture fairings 218, 220, 222 can withstand temperatures between −65 degrees Fahrenheit (F) and 220F. In some examples, the rupture fairings 218, 220, 222 are coupled (e.g., bonded) to the external surface portion 204 with an elastic-type sealant (e.g., polysulfides, polythioethers, silicones, neoprene contact elements, pressure sensitive seals, etc.). Additionally or alternatively, the rupture fairings 218, 220, 222 are coupled and/or assembled to the external surface portion 204 with a mechanical fastener.

In some examples, the rupture fairings 218, 220, 222 form part of a hermetic seal (e.g., the rupture fairings 218, 220, 222 are pressurized or mounted to withstand pressure differentials). In other examples, the rupture fairings 218, 220, 222 are foam-based. Additionally or alternatively, the rupture fairings 218, 220, 222 are provided with a metallic coating (e.g., flame spray, arc spray, plasma spray, metallic paints, vapor depositions, plating, etc.). In some examples, the rupture fairings 218, 220, 222 are installed onto or proximate an external store.

While the example of FIG. 2 is shown in the context of a gun diffuser assembly, examples disclosed herein can be implemented in any aircraft application and/or implementation, such as, but not limited to, cannons, air sampling instruments, air drop resupplies, submunition ejection, leaflet distribution, chaffs/flares, unmanned aerial vehicle release, lasers, beacon marker release, distributed sensor release, vehicle parachutes, rail-launched missiles, launch/launcher tubes, swarm deployment, decoy and/or military pods, etc.

Figure 3A:
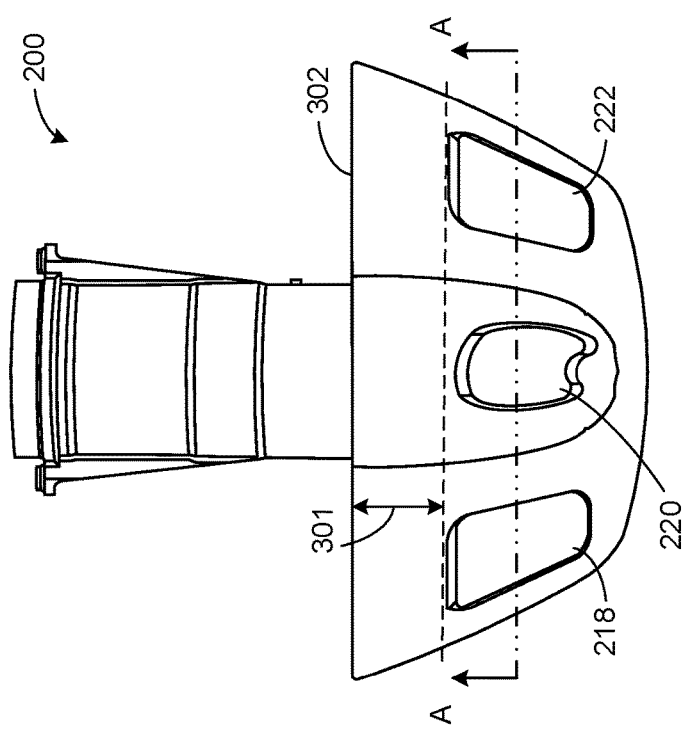
FIGS. 3A and 3B are top and front views, respectively, of the example gun diffuser assembly of FIG. 2.

FIG. 3A is a top view of the example gun diffuser assembly 200 of FIG. 2. According to the illustrated view of FIG. 3A, the rupture fairings 218, 220, 222 are generally aligned at a vertical distance 301 (in the view of FIG. 3A) from a surface (e.g., an interface surface) 302.

Figure 3B:
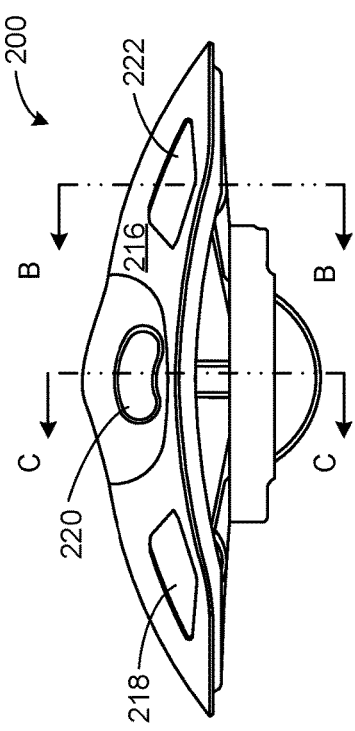

Turning to FIG. 3B, a front view of the example gun diffuser assembly 200 of FIG. 2 is shown. According to the illustrated view, contours of the surface 216 are depicted. In particular, the surface 216 is curved in multiple directions (e.g., curved in three-dimensions). As a result, the surface 216 exhibits a relatively large degree of geometric complexity in this example. Accordingly, the rupture fairings 218, 220, 222 are complementarily shaped to match the contours of the surface 216.

Figure 4A:
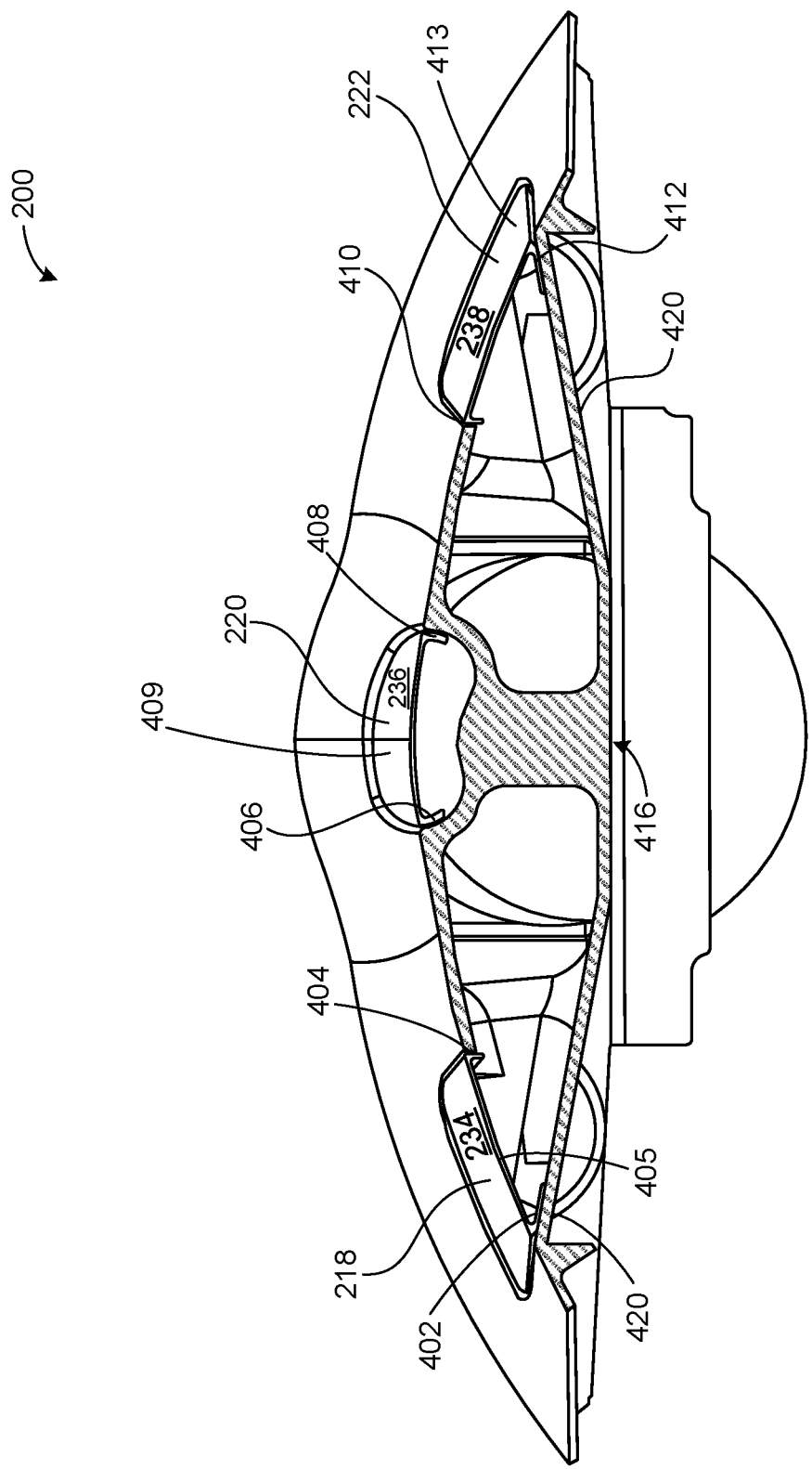
FIG. 4A is a cross-sectional view of the example gun diffuser assembly along a line A-A of FIG. 3A.

FIG. 4A is a cross-sectional view of the example gun diffuser assembly 200 along a line A-A of FIG. 3A. According to the illustrated example, the rupture fairing 218 includes tabs (e.g., alignment tabs, alignment walls, etc.) 402, 404 extending from a thinned membrane 405. Likewise, the rupture fairing 220 includes tabs 406, 408 extending from a thinned membrane 409, and the rupture fairing 222 includes tabs 410, 412 extending from a thinned membrane 413. Further, a substructure 416 of the gun diffuser assembly is shown with corresponding walls 420. In this example, the walls 420 align and/or retain the corresponding tabs 402, 404, 406, 408, 410, 412.

Figure 4B:
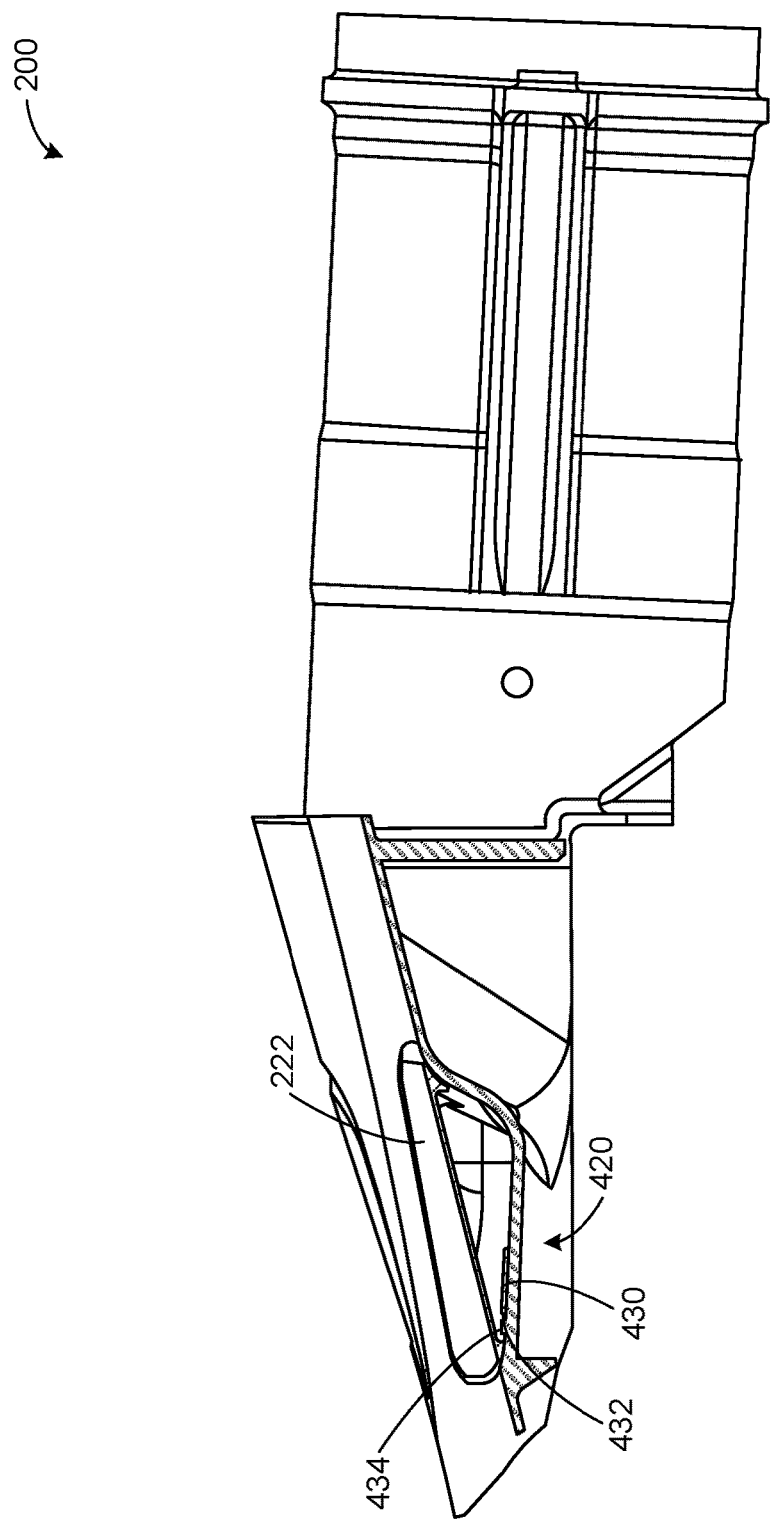
FIG. 4B is a cross-sectional view of the example gun diffuser assembly along a line B-B of FIG. 3B.

FIG. 4B is a cross-sectional view of the example gun diffuser assembly 200 along a line B-B of FIG. 3B. As can be seen in the illustrated example of FIG. 4B, the rupture fairing 222 includes a support wall 430 with an aperture 432 to receive a protrusion 434 of one of the walls 420 described above in connection with FIG. 4A. In particular, the protrusion 434 aligns and retains the rupture fairing 422. In some examples, the aperture 432 receives a fastener, which can be mechanical or chemical for example, to retain and align the rupture fairing 222. Additionally or alternatively, the rupture fairing 222 is snap-fit to the gun diffuser assembly 200 (e.g., snapped into the gun diffuser assembly 200 via retention hooks or tabs).

Figure 4C:
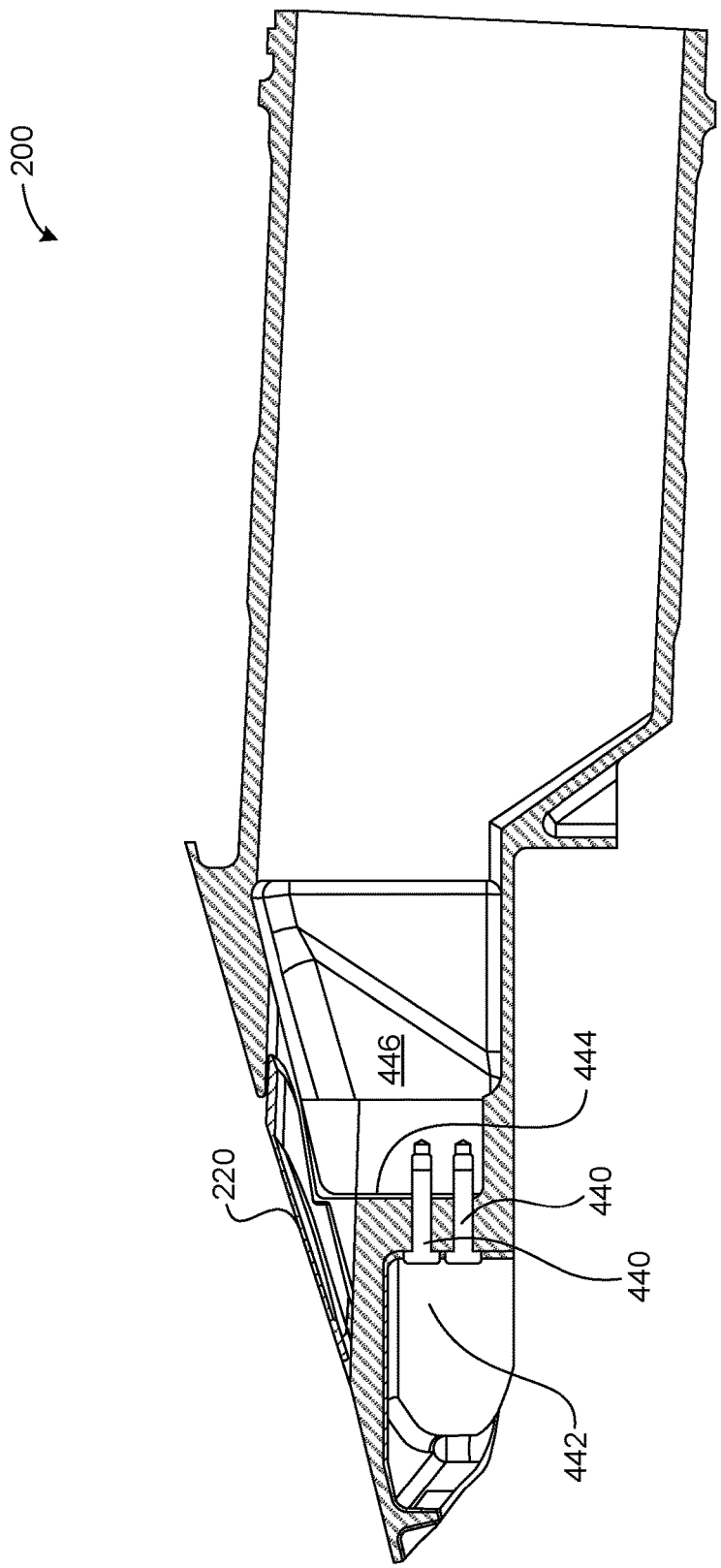
FIG. 4C is a cross-sectional view of the example gun diffuser assembly along a line C-C of FIG. 3B.

FIG. 4C is a cross-sectional view of the example gun diffuser assembly 200 along a line C-C of FIG. 3B. In this example, fasteners 440 are used to captivate a front assembly portion 442 to an assembly tab 444 that is coupled to a body portion 446 of the gun diffuser assembly 200. In other examples, the tab 444 forms part of or is coupled to the rupture fairing 220 or any other ones of the rupture fairings 218, 222. In other words, the rupture fairing 220 can be fastened via a fastener in combination with alignment features, components and/or assemblies.

Figure 5B:
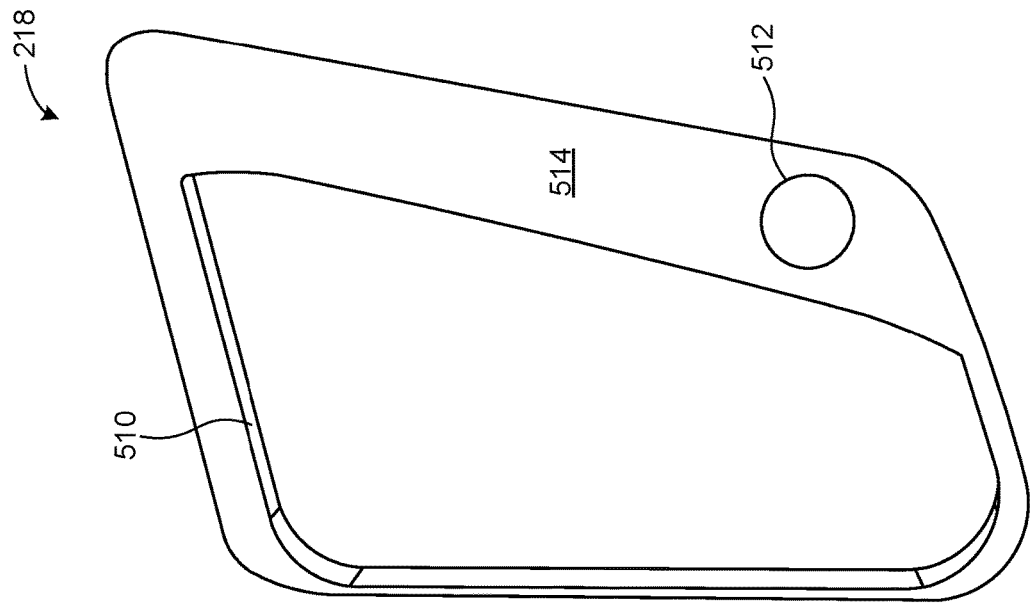
FIGS. 5A and 5B are front and rear detailed views, respectively, of an example rupture fairing shown in FIGS. 2-4C.
Figure 5A:
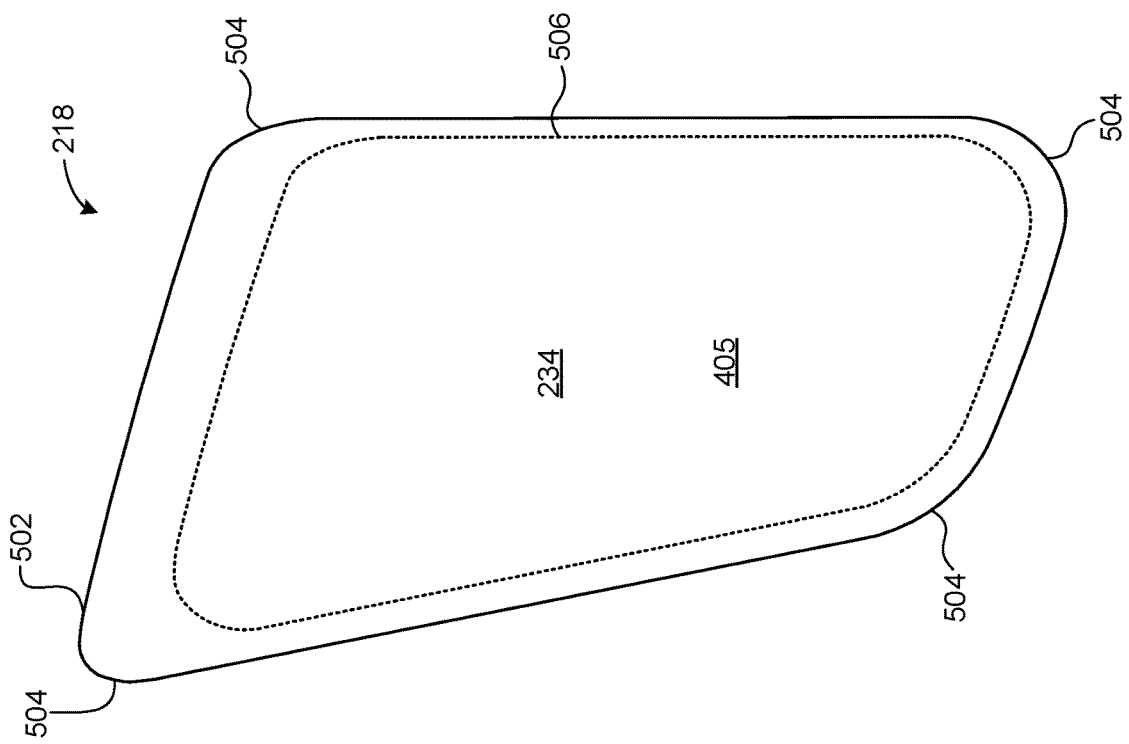

FIGS. 5A and 5B are front and rear detailed views, respectively, of the example rupture fairing 218 of FIGS. 2-4C. Turning to FIG. 5A, the example rupture fairing 218 is shown depicting the corresponding external surface 234 that defines an outer surface of the aircraft 100. In this example, the rupture fairing 218 is contoured with an outer perimeter 502 to fit within the opening 226 of FIG. 2. In other words, the rupture fairing 218 is shaped to fully close and/or seal the corresponding opening 226. Further, the rupture fairing 218 has rounded corners 504 that exhibit a complementary curvature with respect to the opening 226. In this example, a dotted contour 506 depicts the thinned membrane portion 405 also shown in FIG. 4A.

FIG. 5B illustrates a rear view of the rupture fairing 218. According to the illustrated example, the rupture fairing 218 includes rear openings (e.g., holes, apertures, etc.) 510, 512, both of which are at least partially defined by a rear wall 514. As a result, the rear wall 514 partially encloses the rupture fairing 218, thereby defining a support structure to provide support and/or rigidity at different portions of the rupture fairing 218.

Figure 6B:
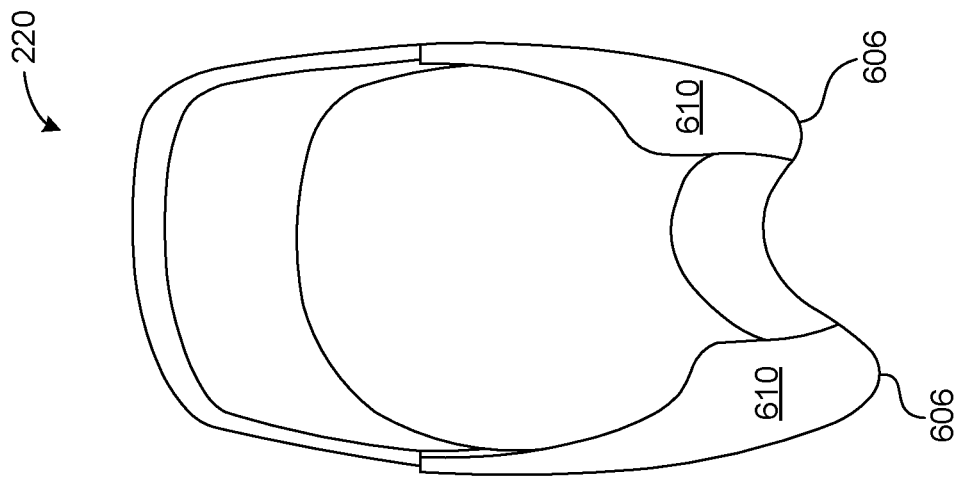
FIGS. 6A and 6B are front and rear detailed views, respectively, of another example rupture fairing shown in FIGS. 2-4C.
Figure 6A:
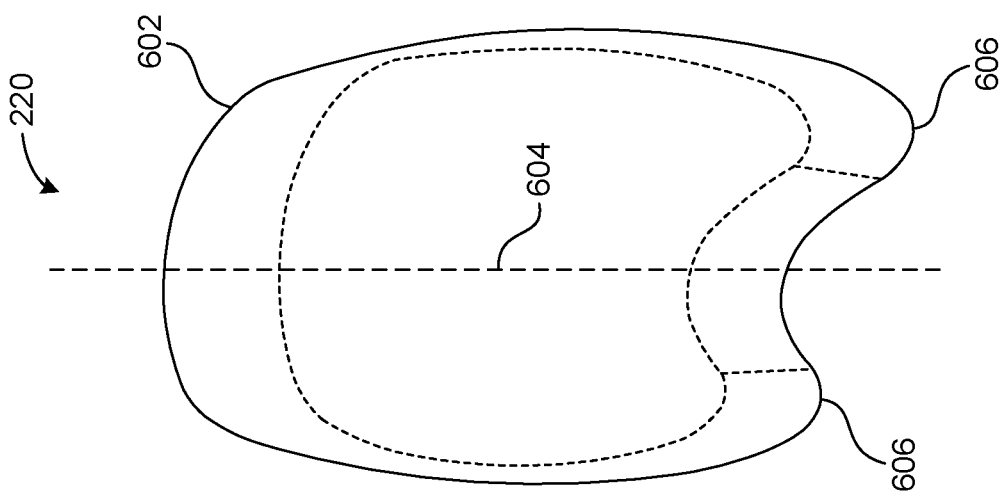

FIGS. 6A and 6B are detailed front and rear views, respectively, of the example rupture fairing 220 of FIGS. 2-4C. Turning to FIG. 6A, an outer perimeter 602, which has a distinct shape from that of the outer perimeter 502 described above in connection with FIG. 5A, is shown. In this particular example, the outer perimeter 602 exhibits an asymmetry about a center line 604 and includes rounded corners or portions 606.

FIG. 6B depicts a rear view of the example rupture fairing 220. In this example, the rupture fairing 220 includes rear walls 610 proximate the rounded corners 606. In some examples, the rear walls 610 provide rigidity to at least a portion of the rupture fairing 220 by increasing a moment of inertia of the rupture fairing 220. Additionally or alternatively, the rear walls 610 are utilized for retention and/or alignment of the rupture fairing 220 (e.g., via a fastener or alignment feature).

Figure 7B:
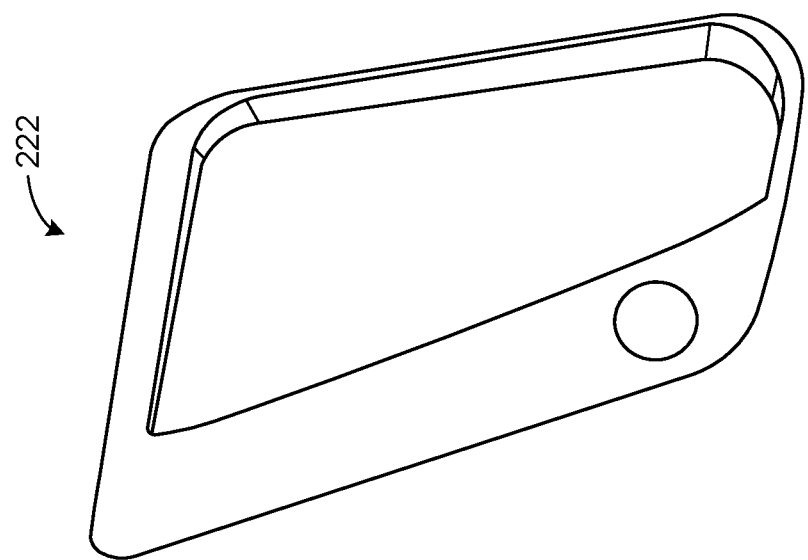
FIGS. 7A and 7B are front and rear detailed views, respectively, of another example rupture fairing shown in FIGS. 2-4C.
Figure 7A:
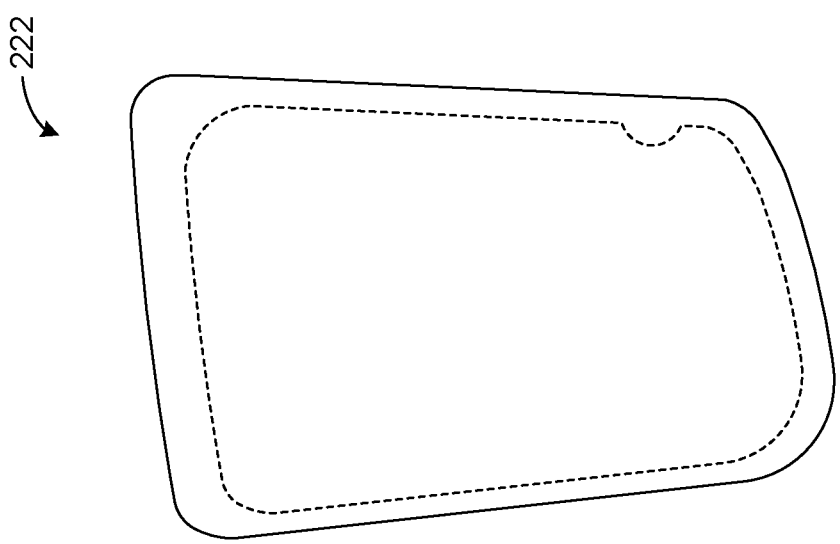

FIGS. 7A and 7B are detailed views front and rear views, respectively, of the example rupture fairing 222 of FIGS. 2-4C. According to these illustrated views, the rupture fairing 222 is similar to the rupture fairing 218, but is, instead, shaped as a mirror image of the rupture fairing 218. In some examples, the rupture fairing 222 is simultaneously produced with the rupture fairing 218 during an additive manufacturing process (e.g., a CLIP process).

Figure 8:
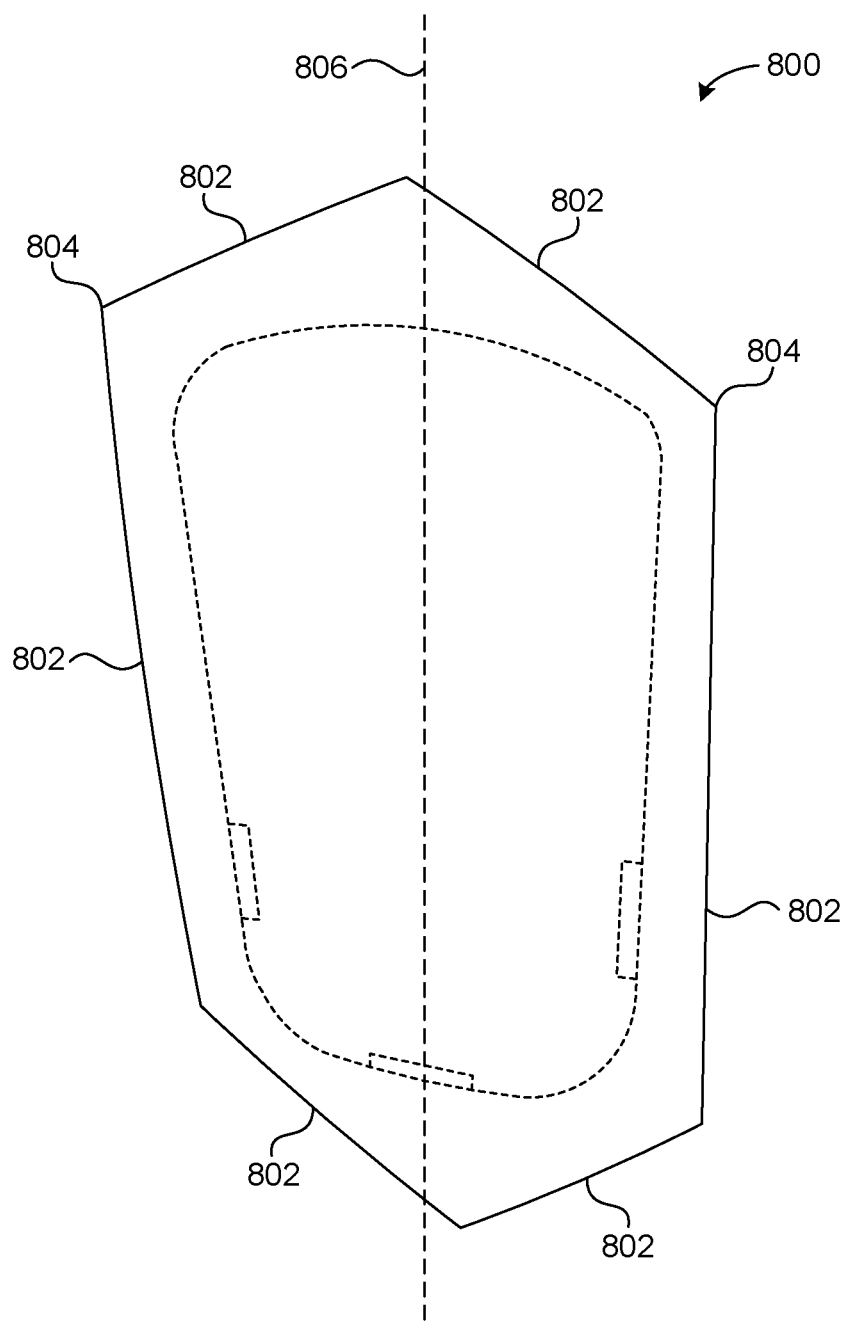
FIG. 8 is a detailed view of another example rupture fairing.

FIG. 8 is a detailed view of another example rupture fairing 800. In contrast to the rupture fairings 218, 220, 222, the rupture fairing 800 includes relatively straight edges 802 and relatively sharp (e.g., non-rounded) corners 804, thereby defining a generally polygonal shape. While a six-sided polygonal shape is shown in this example, any appropriate polygonal shape may be implemented instead (e.g., three-sided, four-sided, five-sided, seven-sided, etc.). Similar to the rupture fairing 220, the rupture fairing 800 also exhibits a generally asymmetric shape about a center line 806.

Figure 9:
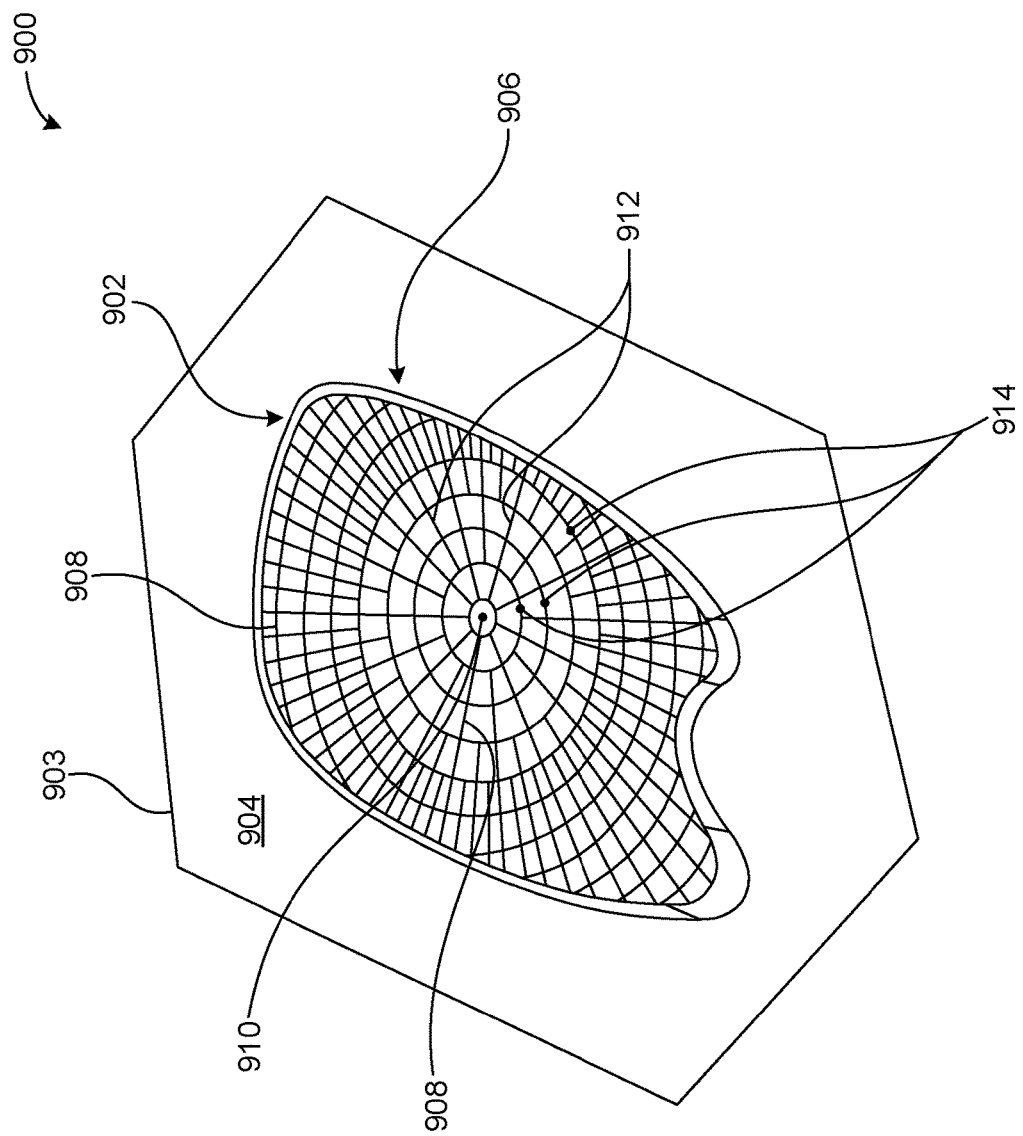
FIG. 9 is a detailed view of another example rupture fairing with a fracture pattern implemented thereon.

FIG. 9 is a detailed view of another example rupture fairing 900 with a fracture pattern 902 implemented thereon. According to the illustrated example of FIG. 9, the rupture fairing 900 includes an outer contour 903, a flange portion 904, and a thinned membrane portion 906. In particular, the thinned membrane portion 906 includes indentations or grooves 908 that extend outwardly from a center (e.g., a radial center, a geometric center of the thinned membrane portion 906) 910. In particular, radial grooves 912 extend radially outward while concentric grooves 914 define concentric ellipses (e.g., circles, arranged in concentric circles).

According to the illustrated example, the arrangement of the radial grooves 912 relative to the concentric grooves 914 in the thinned membrane portion 906 facilitates fracture of the thin membrane portion 906 into relatively small portions and/or fragments, thereby reducing a probability that a relatively large portion of the rupture fairing 900 could be drawn into the air intake 111 and potentially damage the engine 112 of the aircraft 100.

While a concentric grid pattern (e.g., a dartboard pattern) is shown in the example of FIG. 9, any appropriate pattern and/or arrangement of the grooves 908 could be implemented instead. For example, a rectangular grid or grooves that only extend radially can be implemented. Additionally or alternatively, a spider-web-like pattern can be implemented. In some examples, the geometric pattern of grooves are smoothed and/or contoured to provide fatigue resistance by reducing both stress concentrations and undesired crack propagation.

Figure 10:
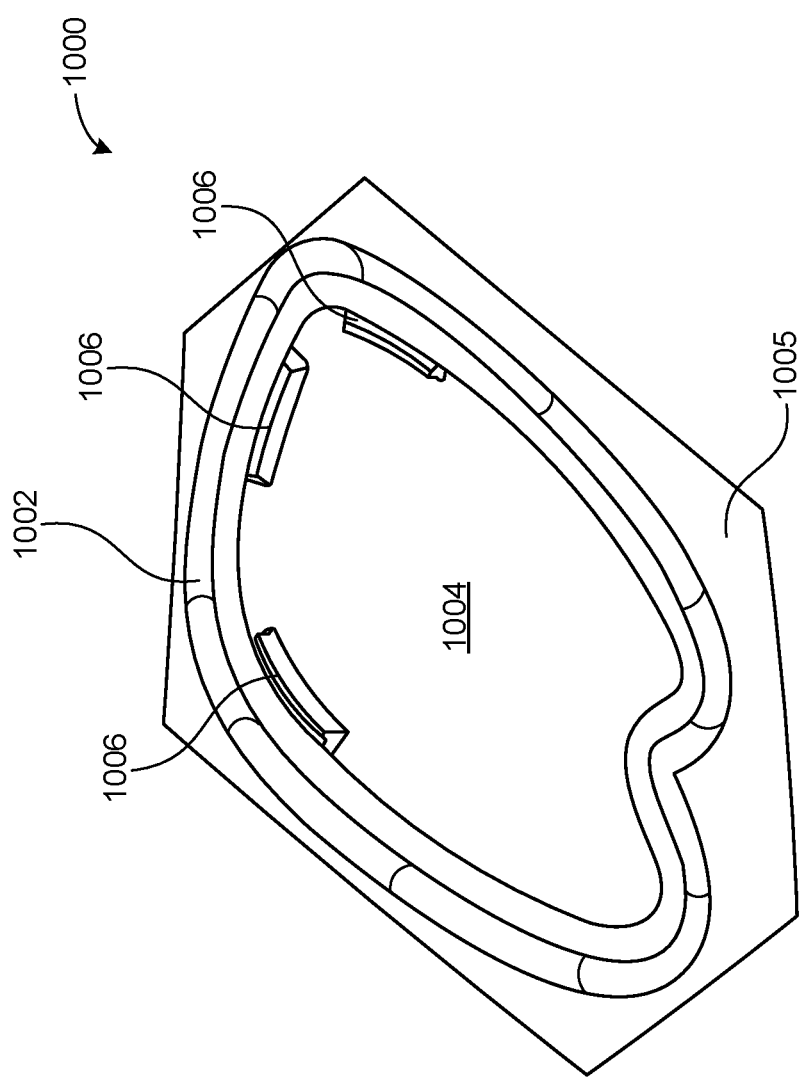
FIG. 10 is a detailed view of another example rupture fairing with relief channels implemented thereon.

FIG. 10 is a detailed view of another example rupture fairing 1000 with relief channels 1002 that surround a periphery of a thinned membrane 1004, and a flange portion 1005. According to the illustrated example, the relief channels 1002 enable the rupture fairing 1000 to have increased flexibility to be conformal to a corresponding part and/or opening, thereby facilitating a better fit and/or sealing therebetween. As a result, more desirable aerodynamic properties can be achieved by reducing a drag coefficient of the aircraft 100.

In some examples, the rupture fairing 1000 also includes stops (e.g., locating stops, locating tabs, alignment tabs, etc.) 1006 extending from or around the thinned membrane 1004. In some such examples, the stops 1006 can be implemented to position and/or align the rupture fairing 1000 relative to a corresponding opening or component and, thus, improve aerodynamic performance of the aircraft 100 by improving a relative alignment. In other examples, the stops 1006 extend from the flange portion 1005. Any of the features shown and described above in connection with FIGS. 4A-10 can be used in combination with one another.

Figure 11:
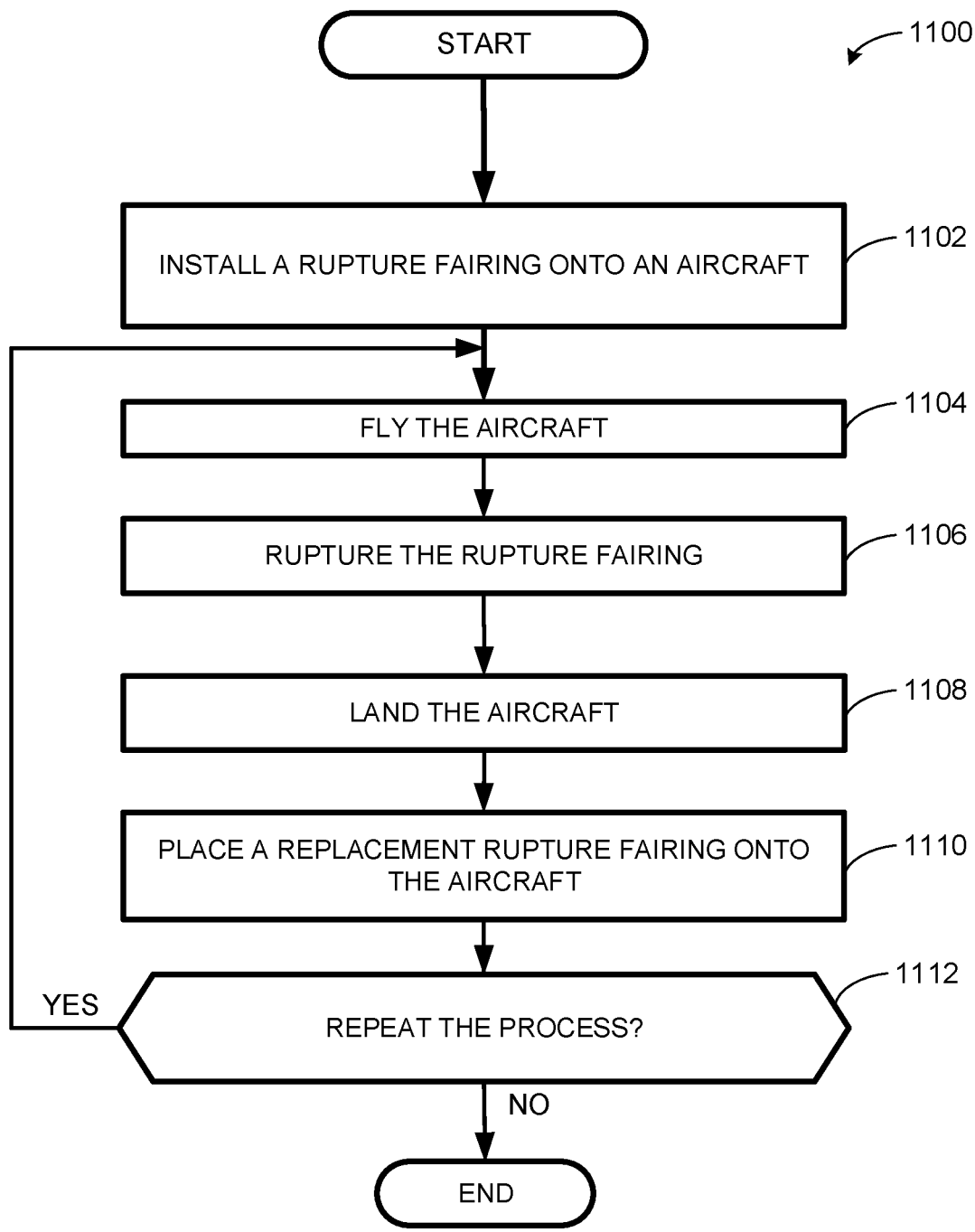
FIG. 11 is a flowchart representative of an example method to implement examples disclosed herein.

FIG. 11 is a flowchart representative of an example method 1100 to implement examples disclosed herein. The example method 1100 begins as the aircraft 100 is being prepared for a flight and/or a mission.

A rupture fairing is installed onto the aircraft 100 (block 1102). In this example, the rupture fairing is mounted onto and positioned relative to a corresponding external opening of the aircraft 100, thereby covering the external opening with reduced or minimal adverse effects to the aerodynamic performance of the aircraft 100. In this example, the rupture fairing is produced via an additive manufacturing process.

The aircraft 100 is flown (block 1104) with the aforementioned rupture fairing installed.

According to the illustrated example, the rupture fairing is ruptured (block 1106). In particular, the rupture fairing is ruptured during operation of a corresponding component and/or assembly (e.g., firing of a gun, deployment of a device, ejection or launch of an object, etc.) associated with the rupture fairing.

In this example, the aircraft 100 is then landed (block 1108).

Next, a replacement rupture fairing is placed onto the aircraft (block 1110). In this example, the replacement fairing is also produced in an additive manufacturing process.

It is then determined whether to repeat the process (block 1112). If the process is to be repeated (block 1112), control returns to block 1104. Otherwise, the process ends. This determination may be based on whether the aircraft is to be flown on a further flight/mission.

Example 1 includes a fairing for use with an aircraft includes a surface to at least partially define an exterior of the aircraft when the fairing is installed onto the aircraft, and a membrane to rupture during flight of the aircraft, wherein the membrane defines at least a portion of the surface.

Example 2 includes the fairing of Example 1, and further includes a fracture pattern defined on the membrane.

Example 3 includes the fairing of Example 2, where the fracture pattern includes first grooves extending radially along the membrane.

Example 4 includes the fairing of Example 3, where a radial center of the first grooves is positioned at a geometric center of the membrane.

Example 5 includes the fairing of Example 3, where the fracture pattern includes second grooves arranged in concentric circles.

Example 6 includes the fairing of Example 1, and further includes a flange portion surrounding the membrane.

Example 7 includes the fairing of Example 1, and further includes a relief channel to increase a conformability of the fairing.

Example 8 includes the fairing of Example 7, where the relief channel surrounds a periphery of the membrane.

Example 9 includes the fairing of Example 7, where the fairing is at least partially composed of cyanate ester.

Example 10 includes an aircraft having a fairing defining at least a portion of an exterior of the aircraft, wherein the fairing covers an opening of the exterior, and a membrane at least partially defining the fairing, wherein the membrane is to be ruptured during a flight of the aircraft.

Example 11 includes the aircraft of Example 10, where the membrane includes a fracture pattern.

Example 12 includes the aircraft of Example 10, where the fairing includes a relief channel to increase a flexibility of the fairing.

Example 13 includes the aircraft of Example 10, where the fairing is at least partially composed of cyanate ester.

Example 14 includes a method of exposing an opening at an external surface of an aircraft during flight of the aircraft including rupturing a membrane of a fairing disposed in the opening of the aircraft during the flight, wherein the fairing at least partially defines the external surface.

Example 15 includes the method of Example 14, where rupturing the membrane occurs when a threshold pressure or a threshold temperature has been exceeded.

Example 16 includes the method of Example 14, where rupturing the membrane includes operating a device to rupture the fairing.

Example 17 includes the method of Example 14, and further includes assembling the fairing to the opening by deforming the fairing via a relief channel of the fairing.

Example 18 includes the method of Example 17, where the relief channel is disposed on a flange portion of the fairing.

Example 19 includes the method of Example 14, where rupturing the membrane includes fracturing a fracture pattern of the membrane.

Example 20 includes the method of Example 19, where the fracture pattern includes concentric and radial grooves.

Example 21 includes an apparatus having means for covering an external opening of an aircraft having means for rupturing the means for covering the external opening to expose the external opening during flight of the aircraft.

Example 22 includes the apparatus of Example 21, where the means for rupturing includes means for fracturing.

Example 23 includes the apparatus of Example 21, and further includes means for increasing a flexibility of the means for covering the external opening.

Example 24 includes the apparatus of Example 21, and further includes means for aligning the means for covering the external opening.

From the foregoing, it will be appreciated that example methods, apparatus and articles of manufacture have been disclosed that enable rupturable fairings with favorable aerodynamic properties. As a result, complex doors, assemblies and/or covers are not needed, thereby saving significant weight and cost.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. Although examples disclosed herein are shown and described in the context of aircraft, examples disclosed herein can be applied to any vehicle (e.g., land vehicles, boats, submarines, etc.) and/or appropriate aerodynamic applications.

What is claimed is:

1. A fairing for use with an aircraft, the fairing comprising:
   a surface to at least partially define an exterior of the aircraft when the fairing is installed onto the aircraft; and
   a membrane to rupture during flight of the aircraft, wherein the membrane defines at least a portion of the surface, the membrane including a base portion having a first thickness and grooves extending therethrough, the grooves defining a second thickness of the membrane that is less than the first thickness, the membrane to rupture along the grooves.

2. The fairing as defined in claim 1, wherein the grooves define a fracture pattern on the membrane.

3. The fairing as defined in claim 1, wherein the grooves extend radially along the membrane.

4. The fairing as defined in claim 3, wherein a radial center of the first grooves is positioned at a geometric center of the membrane.

5. The fairing as defined in claim 3, wherein the grooves are first grooves, the membrane to include second grooves arranged in concentric circles.

6. The fairing as defined in claim 1, further including a flange portion surrounding the membrane.

7. The fairing as defined in claim 1, further including a relief channel to increase a conformability of the fairing.

8. The fairing as defined in claim 7, wherein the relief channel surrounds a periphery of the membrane.

9. The fairing as defined in claim 7, wherein the fairing is at least partially composed of cyanate ester.

10. The fairing as defined in claim 1, wherein rupturing of the membrane is to occur when a threshold pressure or a threshold temperature has been exceeded.

11. The fairing as defined in claim 1, further including a device to rupture the fairing.

12. The fairing as defined in claim 1, wherein the fairing is ruptured upon firing of a weapon.

13. The fairing as defined in claim 1, wherein the fairing is ruptured upon ejection or launch of an object therethrough.

14. The fairing as defined in claim 1, wherein the grooves are arranged in a rectangular grid.

15. The fairing as defined in claim 6, wherein the flange portion fully surrounds an outer perimeter of the membrane.

16. The fairing as defined in claim 6, wherein the flange portion includes a six-sided polygonal shape.

17. An aircraft fairing comprising:
    a surface to at least partially define an exterior of an aircraft when the surface is placed onto an exterior opening of the aircraft; and
    a thinned membrane extending through a portion of the surface, wherein the thinned membrane includes a base portion having a first thickness and grooves that define a second thickness of the thinned membrane that is less than the first thickness, the thinned membrane to rupture along the grooves when a projectile from an interior of the aircraft impacts the thinned membrane.

18. The aircraft fairing as defined in claim 17, wherein the grooves define a fracture pattern on the thinned membrane.

19. The aircraft fairing as defined in claim 17, wherein the grooves extend radially along the thinned membrane.

20. The aircraft fairing as defined in claim 19, wherein a radial center from which the grooves extend radially is positioned at a geometric center of the thinned membrane.

21. The aircraft fairing as defined in claim 19, wherein the grooves are first grooves, the thinned membrane to include second grooves arranged in concentric circles, the second grooves defining a third thickness of the base portion that is equal to or less than the second thickness.

22. The aircraft fairing as defined in claim 17, further including a flange portion surrounding the thinned membrane.

23. The aircraft fairing as defined in claim 22, wherein the flange portion fully surrounds an outer perimeter of the thinned membrane.

* * * * *